United States Patent [19]

Hewett et al.

[11] Patent Number: 5,796,439
[45] Date of Patent: Aug. 18, 1998

[54] VIDEO FORMAT CONVERSION PROCESS AND APPARATUS

[75] Inventors: Douglas E. Hewett, Kent; Richard M. Pier, Bellevue; Thomas A. Gould; Robert Nolen Phelps, both of Issaquah, all of Wash.

[73] Assignee: Siemens Medical Systems, Inc., Iselin, N.J.

[21] Appl. No.: 576,627

[22] Filed: Dec. 21, 1995

[51] Int. Cl.$^6$ ........................................ H04N 7/01
[52] U.S. Cl. ................................ 348/459; 348/443
[58] Field of Search ........................... 348/459, 447, 348/441, 411, 458, 443, 97, 442; 128/660.01, 660.02, 660.04

[56] References Cited

U.S. PATENT DOCUMENTS 4,523,227  6/1985  Hurst ........................................ 348/459
5,404,170  4/1995  Keating ..................................... 348/459

Primary Examiner—Victor R. Kostak

[57] ABSTRACT

A method and apparatus is provided for converting the frame rate of digital video data from one frame rate to another frame rate without introducing motion artifacts into the converted video data stream. A high frame rate video stream is converted into a lower frame rate video stream by selecting whole frames from the high frame rate video stream and outputting the selected frames as the lower frame rate video stream. To insure that only whole frames are selected from the high frame rate video stream, the frame rate of the high frame rate video stream is locked to the frame rate of the lower frame rate video stream. A frame cycle is defined to be an integer number of frames in the higher frame rate stream. The higher and lower frame rates are locked by repeatedly selecting and outputting as the lower frame rate video stream, over a time period that is substantially equal to one frame cycle, an integer number of frames from each frame cycle of the higher frame rate.

17 Claims, 4 Drawing Sheets

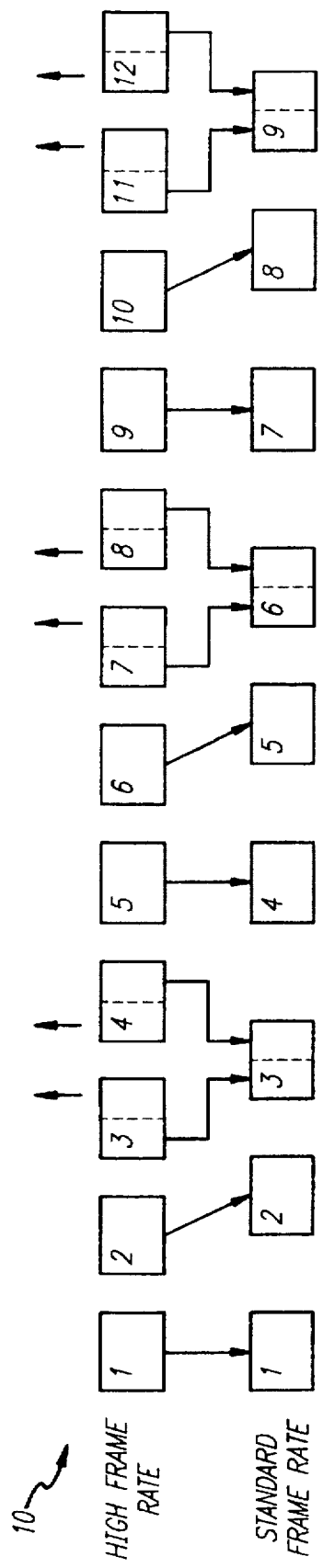
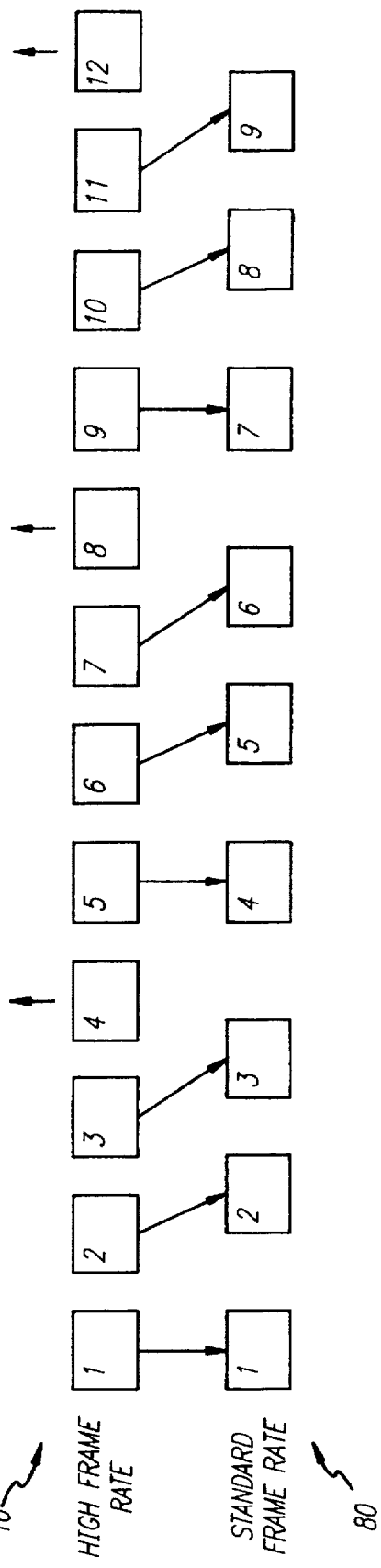

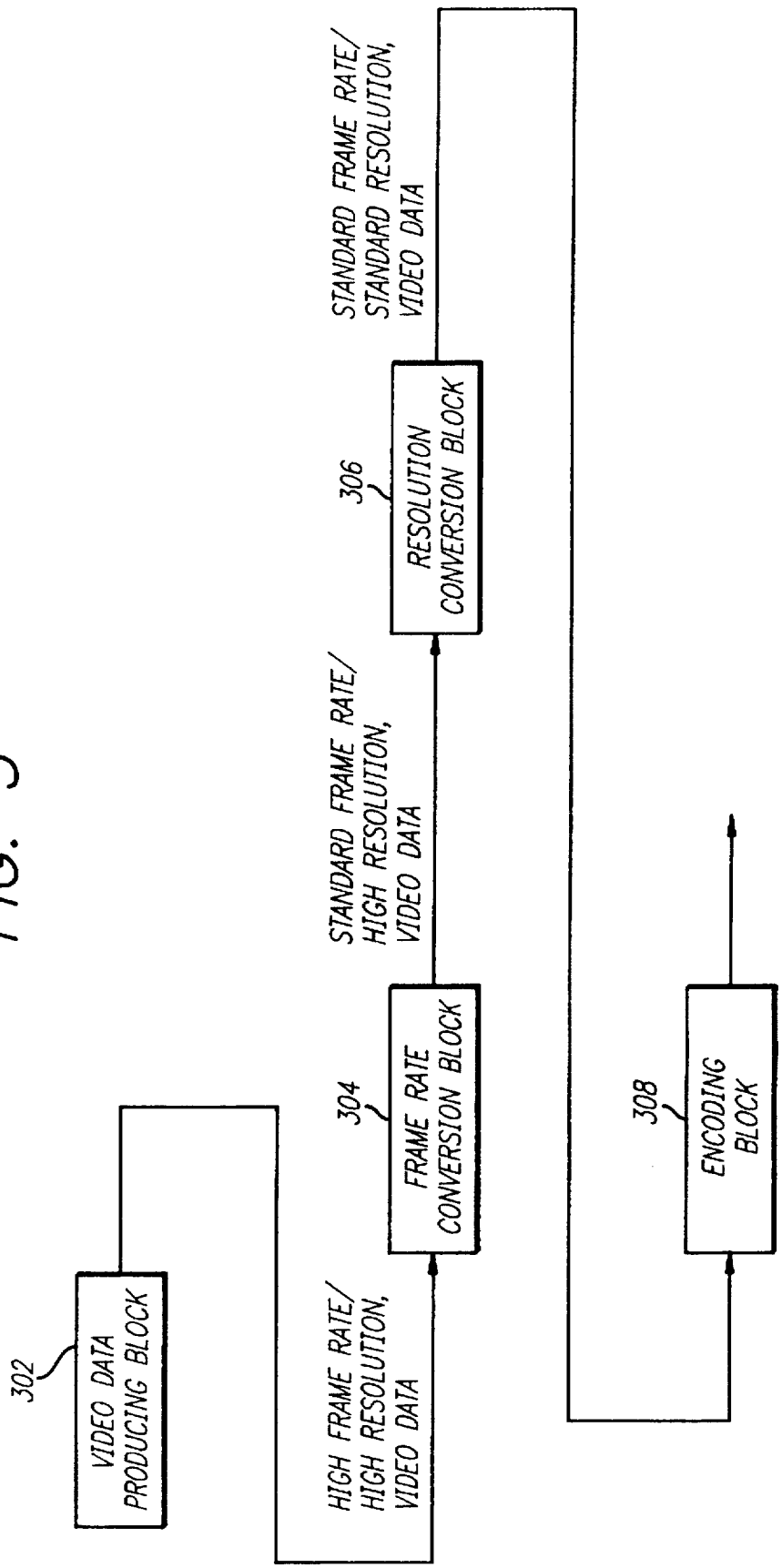

VIDEO FORMAT CONVERSION PROCESS AND APPARATUS

BACKGROUND OF THE INVENTION

1. Field of the Invention

This invention relates to ultrasonic diagnostic imaging, and more particularly, to a process and apparatus for converting a video data stream from one frame rate to another frame rate.

2. Background

Ultrasonic imaging techniques are commonly used to produce two-dimensional images of internal features of an object, such as a human body. Systems that employ ultrasonic imaging techniques typically include an ultrasonic transducer for generating short, ultrasonic pulses that travel into the body and produce echoes by reflecting off of density discontinuities or impedance changes in the body. Some of the echoes return to the transducer, which converts the returning echoes back into electrical signals. An image processor then utilizes the electrical signals to generate an internal image of the body.

Ultrasonic imaging systems are particularly useful in the medical field because they can provide physicians with real-time, high resolution images of the internal features of a human anatomy without resort to more invasive exploratory techniques, such as surgery. The acoustic transducer in a medical imaging system may be packaged within a hand-held device that allows the user substantial freedom to manipulate the transducer easily over a desired area of interest. The transducer would then be electrically connected via a cable to a central control device that processes the electrical signals and creates a video data stream. In turn, the control device transmits the video data stream to a real-time viewing device, such as a video display terminal (VDT). Alternatively, the video data may be printed using an image printer or recorded to enable other physicians to view the diagnostic images at a later date.

Certain ultrasonic medical imaging systems produce video data having a frame rate that is higher than the conventional video industry standard frame rate for image printers and video recorders. As a result, specially designed image printers must be used to print images from the video data, and specially designed video recorders must be used to record the video data. Because it would be more convenient and less expensive to print video data using industry standard image printers and record video data using industry standard video recorders, it would be desirable to reduce the frame rate of video data produced by ultrasonic medical imaging systems to a frame rate that is compatible with standard printers and recorders.

Within the video industry, techniques exist for reducing the frame rate of a video data stream by removing and discarding frames from the data stream. A significant drawback to such techniques, however, is that rather than discarding an entire frame, the techniques often discard portions of two frames and combine the remaining portions of the two frames into a single frame which becomes a frame of the standard frame rate video data. By combining portions of two frames together, undesirable motion artifacts may be introduced into the standard frame rate video data. In addition, critical information regarding an area of interest could be entirely lost.

Motion artifacts in video data can create undesirable visual effects in the images produced from the video data; however, in conventional video systems, the artifacts may not be perceptible to the viewer as it is not necessary to scrutinize a video image with such a level of detail. To the contrary, motion artifacts in video data produced by medical imaging systems present a particularly serious problem because the artifacts may hinder a physician in properly diagnosing the patient's condition by masking or obscuring a critical area of interest. Thus, a critical need exists for a method and apparatus for converting the frame rate of digital video data from one frame rate to another frame rate, and this need is particularly critical in the medical imaging field.

SUMMARY OF THE INVENTION

This invention provides a method and apparatus for converting the frame rate of digital video data from one frame rate to another frame rate without introducing motion artifacts into the converted video data stream. The method and apparatus enables digital video data obtained by an ultrasonic diagnostic imaging system to be recorded and viewed using conventional video recording and reproducing equipment.

In particular, the apparatus includes a frame rate conversion block that receives a digital video data stream at a high frame rate and outputs the video data stream at a standard frame rate. It does so by selecting only whole frames from the high frame rate video stream and outputting the selected whole frames as the standard rate video stream. Because only whole frames from the received high frame rate video data stream are selected for inclusion in the outputted standard frame rate video data stream, the conversion process does not introduce motion artifacts into the standard frame rate data stream.

Two features of the frame rate conversion block insure that only whole frames of the high frame rate video stream are selected for inclusion in the standard frame rate data stream, rather than portions of frames. First, the frame rate conversion block repeatedly selects the same predetermined pattern of frames from each frame cycle of the received high frame rate video stream. Second, the frame rate conversion block locks the frame rate of the received high frame rate video stream to the frame rate of the outputted standard frame rate video stream.

The frame rate conversion block forms part of an imaging system that includes a video data stream producing block for producing a stream of high resolution digital video data at a high frame rate. The frame rate conversion block receives the video data produced by the video data stream producing block and outputs the video data stream at a standard frame rate. A resolution conversion block receives the video data stream from the frame rate conversion block and reduces the resolution of the video data stream to a standard resolution. An encoding block receives the video data stream from the resolution conversion block and interleaves the data stream, adds blanking and synchronization signals to the data stream, and converts the data stream from digital data to an analog signal. The video data stream can then be recorded using an industry standard video recording device or printed using an industry standard image printer.

BRIEF DESCRIPTION OF THE DRAWINGS

FIG. 1 illustrates a conventional method of reducing the frame rate of a digital video data stream;

FIG. 2 illustrates the frame rate conversion method of this invention;

FIG. 3 is a block diagram of a video system that includes the frame conversion apparatus and method of this invention;

DETAILED DESCRIPTION OF THE PREFERRED EMBODIMENT

This invention satisfies the critical need for a method and apparatus for converting the frame rate of digital video data from one frame rate to another frame rate without introducing motion artifacts into the converted video data stream. It does so by selecting only whole frames from the high frame rate data stream rather than portions of frames, and outputting the selected whole frames as the converted video data stream. In the detailed description that follows, like element numerals are used to describe like elements that are illustrated in one or more of the figures.

Figure 4:
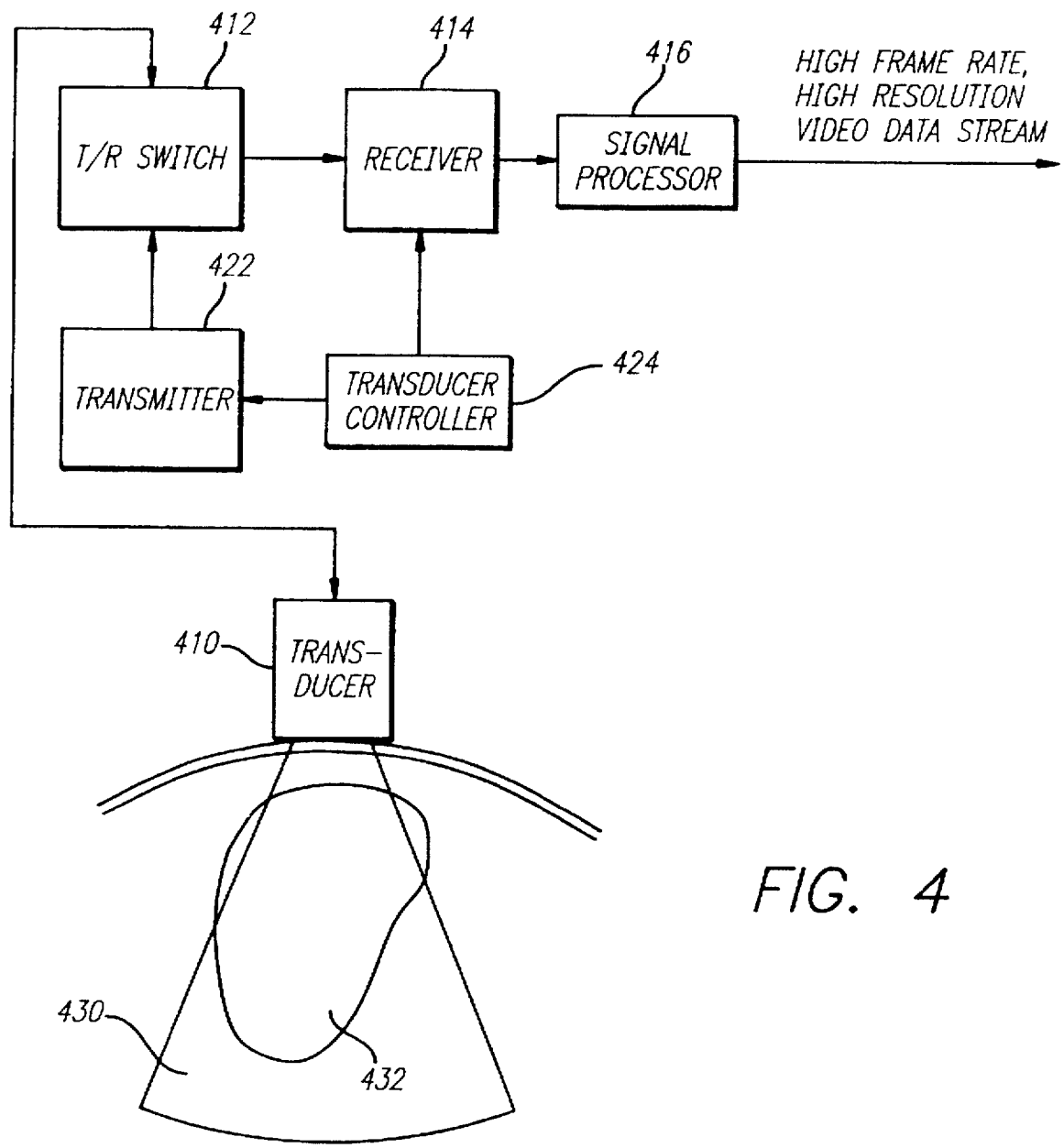
FIG. 4 illustrates the preferred embodiment of the video data stream producing block of this invention.

Referring first to FIG. 4, a conventional ultrasonic medical imaging system is illustrated. The imaging system includes a transducer array 410 comprised of a plurality of separately driven transducer elements. The transducer array 410 may comprise either a one-dimensional array having a plurality of linearly disposed transducer elements, or a two-dimensional array in which the transducer elements are disposed in a matrix. In either configuration, the transducer elements produce acoustic pulses when energized by an electrical signal provided by a transmitter 422. The acoustic pulses travel through the various tissue layers of a patient, and are reflected back from a region of interest 430 to the transducer 410 in the form of echo return pulses.

By way of example, the region of interest 430 of FIG. 4 includes an organ 432. Echoes from the organ 432 return to the transducer 410, which converts the echoes back into electrical signals that are routed to a receiver 414. A transmit/receive switch 412 controls the flow of signals from the transmitter 422 to the transducer 410, and from the transducer to the receiver 414. The transmitter 422, receiver 414, and transmit/receive switch 412 are operated under the control of a transducer controller 424 that is responsive to commands by a sonographer operating the ultrasonic medical imaging system.

A phased array sector scan is performed by controlling the phase of the signals applied by the transmitter 422 to each of the elements of the transducer 410. By imparting a time delay to the electrical signal pulses provided to the successive transducer elements, the signal pulses cumulatively provide a net ultrasonic beam directed at an angle relative to a plane of the transducer array 410 toward a desired focal point. Progressive changes to the extent of the relative time delays cause the beam angle to change in an incremental manner, thus steering the ultrasonic beam in a desired direction along a scan line. The echo return pulses from the focal point differ in phase and amplitude due to the differences in the propagation path travelled by the respective acoustic pulses.

The receiver 414 amplifies and demodulates the echo signals, imparts an appropriate time delay to each of the echo signals, and sums the delayed echo signals to provide a single beamformed signal that indicates the total ultrasonic energy reflected from the focal point. The receiver 414 typically includes an analog-to-digital converter that converts each of the analog echo signals into a series of digital values that can be sampled at a predetermined rate. The beamformed signal is then provided to the signal processor 416, where it is combined with like beamformed signals from other focal points of the scan lines to assemble a complete sector scan image. The signal processor 416 converts the plurality of beamformed signals into a high resolution digital video data stream having a high frame rate.

FIG. 1 illustrates the operation of a prior art technique for reducing the frame rate of a high frame rate video data stream. In FIG. 1, a hypothetical high frame rate video stream 10 is illustrated. The high frame rate video stream, in which twelve frames occur in one time unit, is converted into a hypothetical standard frame rate video stream 80, in which nine frames occur in one time unit. As shown in FIG. 1, frames one and two in the standard frame rate video stream consist entirely of frames one and two, respectively, from the high frame rate stream. However, frame three in the standard frame rate stream 86 consists of a combination of portions of frames three and four of the high frame rate stream. That is, portions of frames three and four of the high frame rate stream are discarded and the remaining portions are combined to form frame three of the standard rate video stream combining portions of frames three and four of the high frame rate stream to produce frame three in the standard frame rate video stream may introduce undesirable motion artifacts into frame three of the standard frame rate video stream.

In contrast, FIG. 2 illustrates the operation of the frame conversion apparatus and method of this invention with respect to the same high frame rate video stream 10. The high frame rate video stream 10, in which twelve frames occur during one time unit, is converted into a hypothetical standard frame rate video stream 80, in which nine frames occur during the same time unit. As shown in FIG. 2, all of the frames in the standard frame rate video stream consist of whole frames selected from the high frame rate video stream. More particularly, whole frames one, two, three, five, six, seven, nine, ten, and eleven are selected from the high frame rate video stream, respectively, and become frames one through nine, respectively, in the standard frame rate video stream. Whole frames four, eight, and twelve of the high frame rate video stream are discarded. Because only whole frames from the high frame rate video stream are selected for inclusion in the standard frame rate video data stream, the conversion process does not introduce motion artifacts into the standard frame rate video data stream.

Referring now to FIG. 3, a block diagram of a video system that includes the frame rate conversion method and apparatus of this invention is illustrate. A video data producing block 302 produces a high resolution digital video data stream at a high frame rate. The video data producing block 302 may actually comprise the ultrasonic imaging system described above with respect to FIG. 4. Alternatively, the video data producing block 302 may comprise previously recorded video data produced by the ultrasonic imaging system.

A frame rate conversion block 304 receives the digital video data stream from the video data producing block 302 and reduces the frame rate of the data stream to a standard frame rate that is compatible with a standard video recorder (not shown) or image printer (not shown). A resolution conversion block 306 receives the data stream from the frame rate conversion block 304 and changes the resolution to a standard resolution that is compatible with the video recorder or image printer. An encoding block 308 then receives the data stream from the resolution conversion block 306. The encoding block 308 may interleave the received data stream, add blanking and synchronization signals to the data stream, and/or convert the data stream to an analog format. The data stream output by the encoding block 308 may be recorded using the standard video recorder or printed using the standard image printer.

Figure 5:
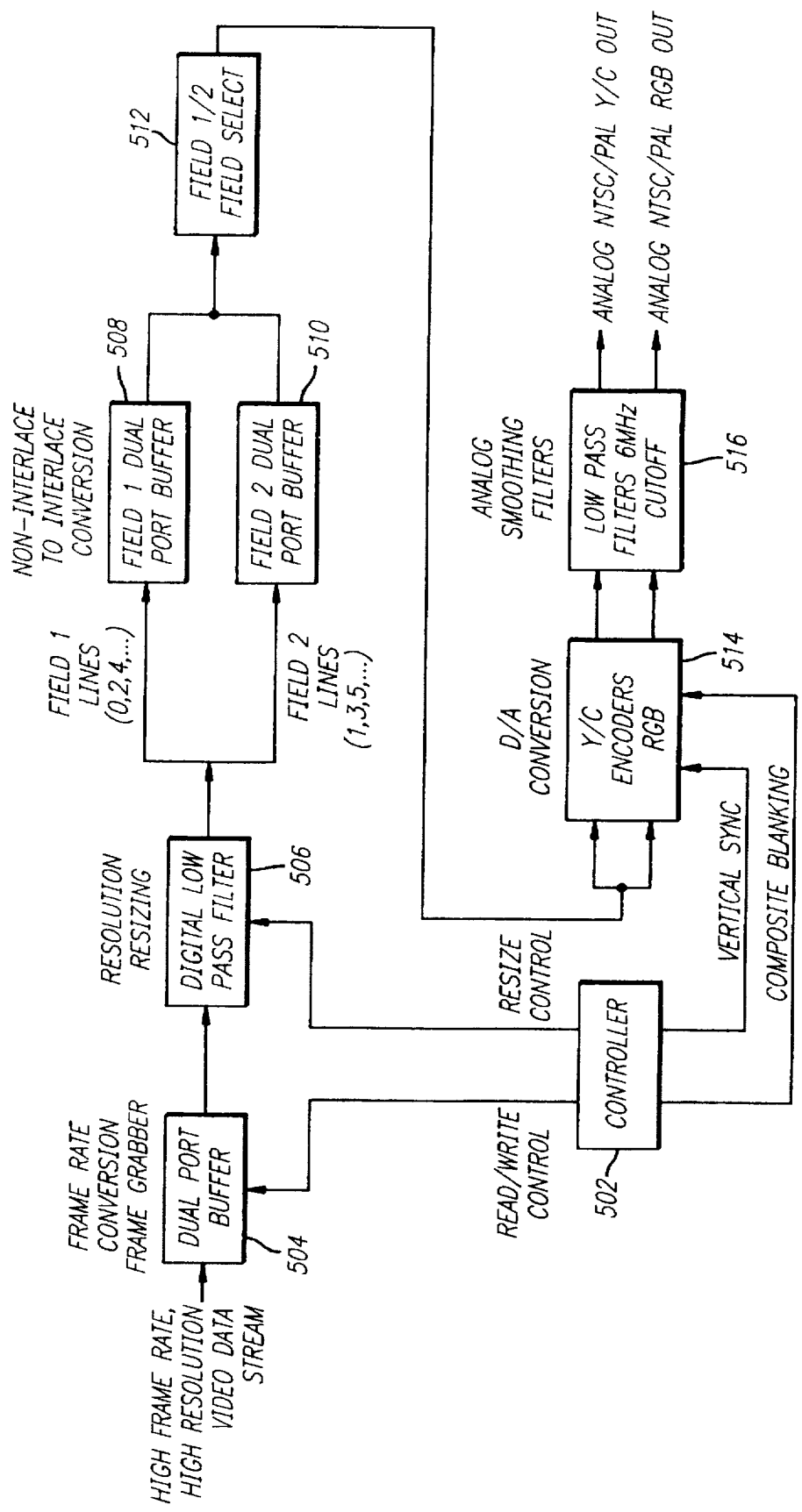
FIG. 5 illustrates the preferred embodiments of the frame rate conversion block, resolution converting block, and encoding block of this invention.

The frame rate conversion block 304 will now be described in greater detail with reference to FIG. 5. As noted above, the frame rate conversion block 304 receives a digital video data stream at a high frame rate and outputs the received video data stream at a reduced frame rate. The frame rate conversion block 304 preferably comprises a dual-port buffer 504 and a controller 502 for controlling read and write signals to the buffer. Although a dual-port buffer is preferred, any data storage device suitable for temporarily storing video data may be used. Moreover, the controller may comprise a dedicated logic circuit, a software or microcode programmable processor, or a combination of one or more logic circuits and processors.

The dual-port buffer 504 receives the high frame rate digital video data stream produced by the signal processor 416. A predetermined integer number of frames in the high frame rate data constitutes one frame cycle. By controlling the read and write signals to the buffer 504, the controller 502 selects a predetermined pattern of frames from each frame cycle of the high frame rate video data stream and outputs the selected frames from the buffer at the desired standard frame rate. To avoid introducing motion artifacts into the video data stream output from the buffer 504, the controller 502 selects and outputs only whole frames—rather than partial frames—from the high frame rate video data stream.

In order to insure that only whole frames are output from the buffer 504, two features are designed into the controller 502. First, the controller 502 locks the high frame rate at which the video data stream is received at the buffer 504 to the standard frame rate at which the selected frames are output from the buffer. The controller 502 locks the input and output frame rates by controlling the read and write signals to the buffer so that all of the frames selected from one frame cycle are output from the buffer 504 during a time period that is substantially equal to one frame cycle. The time period over which all frames selected from one frame cycle are output from the buffer is substantially equal to one frame cycle if the selection pattern and the frame cycle remain synchronized as new frame cycles repeatedly arrive at the buffer 504. The selection pattern and the frame cycle remain synchronized if the same pattern of whole frames is selected from each frame cycle as new frame cycles repeatedly arrive at the buffer 504.

In order to output the frames selected from a frame cycle during a time period that is substantially equal to a frame cycle, the number of frames in a frame cycle and the number of frames selected from each frame cycle must meet two criteria: (1) both numbers must be integers; and (2) the number of frames in a frame cycle divided by the frame rate of the high frame rate data stream received at the buffer 504 must equal the number of frames selected from a frame cycle divided by the standard frame rate at which the selected frames are output from the buffer. The number of frames in the frame cycle and the number of frames selected from the frame cycle thus depend on the frame rate at which frames are received at the buffer 504 and the frame rate at which frames are outputted from the buffer.

Second, the predetermined pattern of frames that the controller 502 selects from each frame cycle must meet the following criteria: (1) frames must be selected from each frame cycle such that a selected frame is loaded in the buffer 504 whenever it is time to output a frame from the buffer; and (2) a newly selected frame must not overwrite a previously selected frame loaded in the buffer until the previously selected frame has been read from the buffer. The particular pattern in which frames are selected from each frame cycle thus will depend on the frame rate at which frames are received at the buffer 504, the frame rate at which frames are outputted from the buffer, and the size of the buffer.

The following examples illustrate the selection of the number of frames in a frame cycle, the number of frames to be selected from each frame cycle, and the pattern in which the frames are to be selected from a frame cycle.

In a first example, a digital video data stream produced by a medical ultrasonic imaging system at a frame rate of 68.68 frames per second is to be converted to the National Television Systems Committee (NTSC) standard frame rate of thirty frames per second. The NTSC standard frame rate is the United States industry standard for video recorders and image printers. The frame cycle size should be fifty-five frames and the number of frames selected from each frame cycle should be twenty-four. This is because fifty-five frames at a frame rate of 68.68 frames per second occur over the same time period (0.8 seconds) that twenty-four frames at thirty frames per second occur. Moreover, assuming that a dual-port buffer that holds at least one frame of data is used, the following pattern of frames should be selected from each frame cycle: the first, third, fifth, seventh, tenth, twelfth, fourteenth, seventeenth, nineteenth, twenty-first, twenty-third, twenty-sixth, twenty-eighth, thirtieth, thirty-third, thirty-fifth, thirty-seventh, thirty-ninth, forty-second, forty-fourth, forty-sixth, forty-ninth, fifty-first, and fifty-third frames in each cycle. The above selection pattern will insure that a selected frame is loaded in the buffer 504 whenever it is time to output a frame from the buffer, and a newly selected frame does not overwrite a previously selected frame loaded in the buffer until the previously selected frame has been read from the buffer. Thus, in this example, the controller 502 would be designed to repeatedly select the above described pattern of frames from every fifty-five frames received at the dual-port buffer 504, and to output the selected frames over a time period substantially equal to 0.8 seconds.

In a second example, a digital video data stream produced by a medical ultrasonic imaging system at a frame rate of 68.18 frames per second is to be converted to the PAL standard frame rate of twenty-five frames per second. The PAL standard frame rate is the European industry standard for video recorders and image printers. The frame cycle size should be thirty frames and the number of frames selected from each frame cycle should be eleven. This is because thirty frames at a frame rate of 68.18 frames per second occur over the same time period (0.44 seconds) that eleven frames at twenty-five frames per second occur. Moreover, assuming that a dual-port buffer that holds at least one frame of data is used, the following pattern of frames should be selected from each frame cycle: the first, third, sixth, ninth, eleventh, fourteenth, seventeenth, twentieth, twenty-second, twenty-fifth, twenty-eighth frames in each cycle. The above selection pattern will insure that a selected frame is loaded in the buffer 504 whenever it is time to output a frame from the buffer, and a newly selected frame does not overwrite a previously selected frame loaded in the buffer until the previously selected frame has been read from the buffer. Thus, in this example, the controller 502 would be designed to repeatedly select the above described pattern of frames from every thirty frames received at the dual-port buffer 504, and to output the selected frames over a time period substantially equal to 0.44 seconds.

The resolution conversion block 306 of FIG. 3 will now be described in greater detail with reference to FIG. 5. The resolution conversion block receives a video data stream having a high resolution and outputs a video data stream having a standard resolution. The resolution conversion block 306 preferably comprises a digital low pass filter 506 and a controller 502 programmed to control filtering characteristics of the low-pass filter 506. Digital low-pass filters are well known in the art, and consequently, will not be further described. The controller 502 may comprise a logic circuit, a software or microcode programmable processor, or a combination of one or more logic circuits and processors.

The encoding block 308 of FIG. 3 will now be described in greater detail with reference to FIG. 5. The encoding block interleaves the video data stream, adds synchronization and blanking signals to the video data stream, and converts the video data stream to an analog signal. The encoding block 308 preferably includes two dual-port buffers 508, 510 and a field select 512 for interleaving the received video data stream. Interleaving operations are well known in the art and will not be further described. The encoding block 308 also preferably includes a controller 502 and an analog-to-digital converter 514 for adding blanking and synchronization signals to the video data stream and converting the video data stream to an analog signal, and an analog filter 516 for smoothing the resulting analog signal. Such devices are well known in the art and will not be further described.

Although in the frame rate conversion block 304 described above forms a part of an ultrasonic medical imaging system, it should be apparent that the frame rate conversion block 304 could be used as part of any system in which digital video data is converted from one frame rate to another frame rate. Moreover, although the frame rate conversion block 304 reduces the frame rate of a received digital video data stream, the frame rate conversion block 304 could be used to increase the frame rate of a received digital video stream. More particularly, the frame rate conversion block 304 could duplicate rather than delete a number of frames in each frame cycle of a received digital video data stream and output the duplicated frames twice, thus increasing the frame rate of digital video data stream received by the frame rate conversion block 304.

The invention is defined by the following claims.

What is claimed is:

1. A frame rate conversion apparatus comprising:

receiving means for receiving a digital video data stream at a first frame rate, said digital video data stream comprising a sequence of frames wherein a first integer number of said frames comprises a single frame cycle of said digital video data stream;

selecting means for selecting a second integer number of whole frames from each one of said frame cycles received by said receiving means in a predetermined pattern of said whole frames, said second integer being less than said first integer such that plural, non-contiguous ones of said whole frames are excluded from each said frame cycle;

outputting means for outputting at a second frame rate said whole frames selected by said selecting means; and locking means for locking said first frame rate to said second frame rate.

2. The apparatus of claim 1, wherein said locking means comprises means for constraining said outputting means to output said second integer number of whole frames over a time period that is substantially equal to a time period over which said first integer number of frames is received by said receiving means.

3. The apparatus of claim 1, wherein said receiving means comprises a data storage device.

4. The apparatus of claim 3, wherein said outputting means comprises a controller adapted to control an output signal to said data storage device.

5. A frame rate conversion apparatus comprising:

receiving means for receiving a digital video data stream at a first frame rate, said digital video data stream comprising a sequence of frames wherein a first integer number of said frames comprises a single frame cycle of said digital video data stream;

selecting means for selecting a second integer number of whole frames from each one of said frame cycles received by said receiving means, said second integer being less than said first integer, wherein said selecting means further comprises means for selecting said second integer number of frames from each one of said frame cycles received by said receiving means in a predetermined pattern;

outputting means for outputting at a second frame rate said whole frames selected by said selecting means; and locking means for locking said first frame rate to said second frame rate;

wherein said predetermined pattern further comprises a first, third, fifth, seventh, tenth, twelfth, fourteenth, seventeenth, nineteenth, twenty-first, twenty-third, twenty-sixth, twenty-eighth, thirtieth, thirty-third, thirty-fifth, thirty-seventh, thirty-ninth, forty-second, forty-fourth, forty-sixth, forty-ninth, fifty-first, and fifty-third ones of said frames in each said frame cycle.

6. A frame rate conversion apparatus comprising:

receiving means for receiving a digital video data stream at a first frame rate, said digital video data stream comprising a sequence of frames wherein a first integer number of said frames comprises a single frame cycle of said digital video data stream;

selecting means for selecting a second integer number of whole frames from each one of said frame cycles received by said receiving means, said second integer being less than said first integer, wherein said selecting means further comprises means for selecting said second integer number of frames from each one of said frame cycles received by said receiving means in a predetermined pattern;

outputting means for outputting at a second frame rate said whole frames selected by said selecting means; and locking means for locking said first frame rate to said second frame rate;

wherein said predetermined pattern further comprises a first, third, sixth, ninth, eleventh, fourteenth, seventeenth, twentieth, twenty-second, twenty-fifth, twenty-eighth ones of said frames in each said frame cycle.

7. The apparatus of claim 1, wherein said first frame rate is greater than said second frame rate.

8. A frame rate conversion method comprising the steps of:

receiving a digital video data stream at a first frame rate, said digital video data stream comprising a sequence of frames, a first integer number of said frames comprising a frame cycle of said digital video data stream;

selecting a second integer number of whole frames from each of a plurality of said frame cycles received in said receiving step in accordance with a predetermined pattern of said whole frames, said second integer being less than said first integer so that plural, non-contiguous ones of said whole frames are excluded from each said frame cycle;

outputting said whole frames selected in said selecting step at a second frame rate; and locking said first frame rate to said second frame rate.

9. The method of claim 8, wherein said locking step comprises the step of constraining said outputting step to output said second integer number of whole frames over a time period that is substantially equal to a time period over which said first integer number of frames is received at said receiving step.

10. An imaging apparatus comprising:

video data producing means for producing a digital video data stream at a first frame rate, said digital video data stream comprising a sequence of frames, a first integer number of frames comprising a frame cycle of said digital video data stream;

frame rate conversion means for converting said digital video data stream from said first frame rate to a second frame rate, said frame rate conversion means comprising:

receiving means for receiving said digital video data stream at said first frame rate, selecting means for selecting a second integer number of whole frames from each one of a plurality of said frame cycles received by said receiving means, said second integer being less than said first integer, outputting means for outputting at said second frame rate said whole frames selected by said selecting means, and locking means for locking said first frame rate to said second frame rate;

resolution conversion means for receiving said digital video data stream at said second video frame rate and converting said digital video data stream received at said second frame rate from a first resolution to a second resolution; and encoding means for receiving said digital video data stream at said second frame rate and at said second resolution and encoding said digital video data stream received at said second frame rate and said second resolution.

11. The apparatus of claim 10, wherein said video data producing means comprises an ultrasonic imaging system.

12. The apparatus of claim 10, wherein said resolution conversion means comprises a low-pass digital filter.

13. The apparatus of claim 10, wherein said encoding means comprises means for interlacing said digital video data stream received at said second frame rate and said second resolution.

14. The apparatus of claim 10, wherein said encoding means comprises means for adding blanking signals and sync signals to said digital video data stream received at said second frame rate and said second resolution.

15. The apparatus of claim 10, wherein said selecting means comprises means for selecting said second integer number of frames from each one of said frame cycles received by said receiving means in a predetermined pattern.

16. The apparatus of claim 15, wherein said predetermined pattern further comprises a first, third, fifth, seventh, tenth, twelfth, fourteenth, seventeenth, nineteenth, twenty-first, twenty-third, twenty-sixth, twenty-eighth, thirtieth, thirty-third, thirty-fifth, thirty-seventh, thirty-ninth, forty-second, forty-fourth, forty-sixth, forty-ninth, fifty-first, and fifty-third ones of said frames in each said frame cycle.

17. The apparatus of claim 15, wherein said predetermined pattern further comprises a first, third, sixth, ninth, eleventh, fourteenth, seventeenth, twentieth, twenty-second, twenty-fifth, twenty-eighth ones of said frames in each said frame cycle.

* * * * *